United States Patent
Chiu et al.

(10) Patent No.: US 11,640,402 B2
(45) Date of Patent: May 2, 2023

(54) LOAD BALANCING IN STREAMS PARALLEL REGIONS

(71) Applicant: International Business Machines Corporation, Armonk, NY (US)

(72) Inventors: Henry Chiu, San Jose, CA (US); Bradley William Fawcett, Byron, MN (US); Jingdong Sun, Rochester, MN (US); Jason A. Nikolai, Rochester, MN (US); Paul Gerver, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/935,427

(22) Filed: Jul. 22, 2020

(65) Prior Publication Data

US 2022/0027371 A1    Jan. 27, 2022

(51) Int. Cl.
| | | |
|---|---|---|
| *G06F 16/2455* | (2019.01) | |
| *G06F 16/2453* | (2019.01) | |
| *H04L 65/60* | (2022.01) | |
| *H04L 47/125* | (2022.01) | |
| *G06F 9/50* | (2006.01) | |

(52) U.S. Cl.
CPC ...... *G06F 16/24568* (2019.01); *G06F 9/5083* (2013.01); *G06F 16/24532* (2019.01); *H04L 47/125* (2013.01); *H04L 65/60* (2013.01)

(58) Field of Classification Search
CPC ............. G06F 16/24568; G06F 9/4881; G06F 11/0793; G06F 16/9024; H04L 41/5025; H04L 47/41; H04L 47/76; H04L 5/0064; H04L 67/1002
See application file for complete search history.

(56) References Cited

U.S. PATENT DOCUMENTS

| | | | |
|---|---|---|---|
| 8,572,051 B1 * | 10/2013 | Chen | G06F 16/24532 |
| | | | 707/999.2 |
| 9,329,858 B2 | 5/2016 | Nicol | |

(Continued)

FOREIGN PATENT DOCUMENTS

| | | |
|---|---|---|
| CN | 101089819 A | 12/2007 |
| CN | 103634394 A | 3/2014 |

(Continued)

OTHER PUBLICATIONS

Nasir et al., "The Power of Both Choices: Practical Load Balancing for Distributed Stream Processing Engines", arXiv:1504.00788v1 [cs.DC] Apr. 3, 2015, IEEE, 12 pages.

(Continued)

*Primary Examiner* — Shean Tokuta
(74) *Attorney, Agent, or Firm* — Brian M. Restauro (57) ABSTRACT

In response to receiving a flow of data, one or more operators in a parallel region included in a distributed data processing system for stream processing the flow of data are initialized. In response to identifying a change to the flow of data or a change to the distributed data processing system, at least one of the flow of data and a size of the parallel region included in the distributed data processing system are dynamically adjusted. The flow of data is processed via the dynamically adjusted one of the flow of data and the parallel region included in the distributed data processing system.

18 Claims, 4 Drawing Sheets

(56) References Cited

U.S. PATENT DOCUMENTS

| | | | |
|---|---|---|---|
| 9,456,014 B2 | 9/2016 | Luo | |
| 9,996,561 B1* | 6/2018 | Barsness | G06F 16/21 |
| 10,025,637 B2* | 7/2018 | Cook | G06F 9/4881 |
| 10,049,136 B1* | 8/2018 | Barsness | G06F 16/24568 |
| 10,095,745 B2 | 10/2018 | Ricardo | |
| 10,303,695 B2* | 5/2019 | Deshmukh | G06F 16/9535 |
| 2002/0174379 A1* | 11/2002 | Korenevsky | G06F 16/21 |
| | | | 714/E11.13 |
| 2009/0313400 A1 | 12/2009 | Amini | |
| 2011/0083046 A1* | 4/2011 | Andrade | G06F 11/0793 |
| | | | 714/47.1 |
| 2012/0137164 A1* | 5/2012 | Uhlig | G06F 9/00 |
| | | | 714/4.11 |
| 2013/0031335 A1* | 1/2013 | Santosuosso | G06F 9/06 |
| | | | 712/30 |
| 2014/0068578 A1* | 3/2014 | Gedik | G06F 8/456 |
| | | | 717/149 |
| 2014/0355438 A1* | 12/2014 | Gedik | H04L 47/11 |
| | | | 370/235 |
| 2015/0134626 A1 | 5/2015 | Theimer | |
| 2016/0103697 A1* | 4/2016 | Bragstad | H05K 999/99 |
| | | | 718/1 |
| 2016/0188376 A1 | 6/2016 | Rosas | |
| 2017/0033979 A1* | 2/2017 | Cradick | H04L 43/08 |
| 2017/0153927 A1* | 6/2017 | Cook | G06F 9/50 |
| 2017/0235555 A1* | 8/2017 | Cook | G06F 9/44521 |
| | | | 717/153 |
| 2017/0331868 A1* | 11/2017 | Cook | H04L 65/61 |
| 2017/0337067 A1* | 11/2017 | Cradick | G06F 11/3006 |
| 2017/0337253 A1 | 11/2017 | An | |
| 2018/0074657 A1* | 3/2018 | Barsness | G06F 9/44 |
| 2018/0083839 A1* | 3/2018 | Fawcett | H04L 41/20 |
| 2018/0198730 A1* | 7/2018 | Cook | H04L 65/60 |
| 2018/0270123 A1* | 9/2018 | Cook | H04L 65/762 |
| 2018/0278663 A1* | 9/2018 | Cook | H04L 67/10 |
| 2018/0324069 A1* | 11/2018 | Kleinheksel | H04L 67/1001 |
| 2019/0130004 A1* | 5/2019 | Singh | G06F 16/283 |
| 2019/0235919 A1* | 8/2019 | Barsness | G06F 16/2282 |
| 2019/0288947 A1 | 9/2019 | Jain | |
| 2020/0004600 A1* | 1/2020 | Acker | H04L 67/10 |
| 2020/0076710 A1* | 3/2020 | Leon-Garcia | H04L 47/125 |
| 2020/0099594 A1* | 3/2020 | Tudoran | H04L 41/5032 |
| 2020/0389546 A1* | 12/2020 | Kumarasubramanian | H04L 67/1095 |

FOREIGN PATENT DOCUMENTS

| | | |
|---|---|---|
| CN | 105022671 A | 11/2015 |
| CN | 106648904 A | 5/2017 |
| CN | 106844483 A | 6/2017 |
| CN | 108241525 A | 7/2018 |
| KR | 101867220 B1 | 6/2018 |
| WO | 2022017372 A1 | 1/2022 |

OTHER PUBLICATIONS

Rivetti et al., "Efficient Key Grouping for Near-Optimal Load Balancing in Stream Processing Systems", DEBS '15, Jun. 29-Jul. 3, 2015, Oslo, Norway, Copyright 2015 ACM 978-1-4503-3286-6/15/06, DOI: http://dx.doi.org/10.1145/2675743.2771827, 12 pages.

Schneider et al., "Dynamic Load Balancing for Ordered Data-Parallel Regions in Distributed Streaming Systems", Middleware'16, Dec. 12-16, 2016, Trento, Italy, © 2016 ACM. ISBN 978-1-4503-4300-8/16/12, DOI: http://dx.doi.org/10.1145/2988336.2990475, 14 pages.

"Patent Cooperation Treaty PCT Notification of Transmittal of the International Search Report and the Written Opinion of the International Searching Authority, or the Declaration", Applicant's file reference PF210386PCT, International application No. PCT/CN2021/107323, International filing date Jul. 20, 2021 (Jul. 20, 2021), dated Oct. 21, 2021. (Oct. 21, 2021), 9 pages.

* cited by examiner

LOAD BALANCING IN STREAMS PARALLEL REGIONS

BACKGROUND

The present invention relates generally to the field of stream computing applications, and more particularly to balancing the flow of data in parallel regions of stream data processing.

Stream processing is the processing of data in motion, or in other words, computing on data directly as it is produced or received. Stream processing is a big data technology. The majority of data are born as continuous streams: sensor events, user activity on a website, financial trades, and so on—all these data are created as a series of events over time and stream processing can detect conditions quickly, within a small time period of receiving the data. The detection time period varies from few milliseconds to minutes. For example, with stream processing, an alert can be received when the temperature has reached the freezing point by querying data streams coming from a temperature sensor. Before stream processing, this type of data was often stored in a database, a file system, or other forms of mass storage. Applications would query the data or compute over the data as needed. Steam processing is also called by many other names: real-time analytics, streaming analytics, Complex Event Processing, real-time streaming analytics, and event processing.

SUMMARY OF THE INVENTION

Embodiments of the present invention include an approach for analyzing electrical circuit schematics to determine their function. In one embodiment, in response to receiving a flow of data, one or more operators in a parallel region included in a distributed data processing system for stream processing the flow of data are initialized. In response to identifying a change to the flow of data or a change to the distributed data processing system, at least one of the flow of data and a size of the parallel region included in the distributed data processing system are dynamically adjusted. The flow of data is processed via the dynamically adjusted one of the flow of data and the parallel region included in the distributed data processing system.

DETAILED DESCRIPTION

Embodiments of the present invention recognize that the amount of available data is increasing rapidly. Sources of data include, but are not limited to, Internet of Things devices, any number of sensors (temperature, barometric pressure, wind, water level, water pressure, seismic, etc.), data from machines in various industries, social media data, and transactional data such as financial transaction data. Processing large volumes of these structured and/or unstructured data can mean first storing the data, which is costly due to the required memory resources (e.g., computer servers with database storage), and then querying the data. Because of the time involved with this methodology, real-time trends in the data can be missed resulting in missed opportunity. A method for processing data faster, in real, or near real-time, is needed.

Embodiments of the present invention recognize that there may be a method, computer program product, and computer system for balancing the flow of data in parallel regions of a distributed data processing system for processing a stream of data in the real-time analysis of big data. In an embodiment, the flow of data within a stream processing application can be directed by the method, the computer program product, and the computer system based on (i) attributes of the data (e.g., highest versus constant data rate, throttling of data, priority queueing of data, etc.) and (ii) attributes of the computing system (e.g., amount of resources within the system, usage of resources, failover/failback of resources, parallelizing resources, etc.). Further, the method, the computer program product, and the computer system can dynamically balance the plurality of operators within the parallel region of the stream processing application to react to changes in the data or computing system. In various embodiments, the method, computer program product, and computer system improve computer technology by providing a more efficient means to process large volumes of data in real- or near real-time without storing said data prior to processing.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
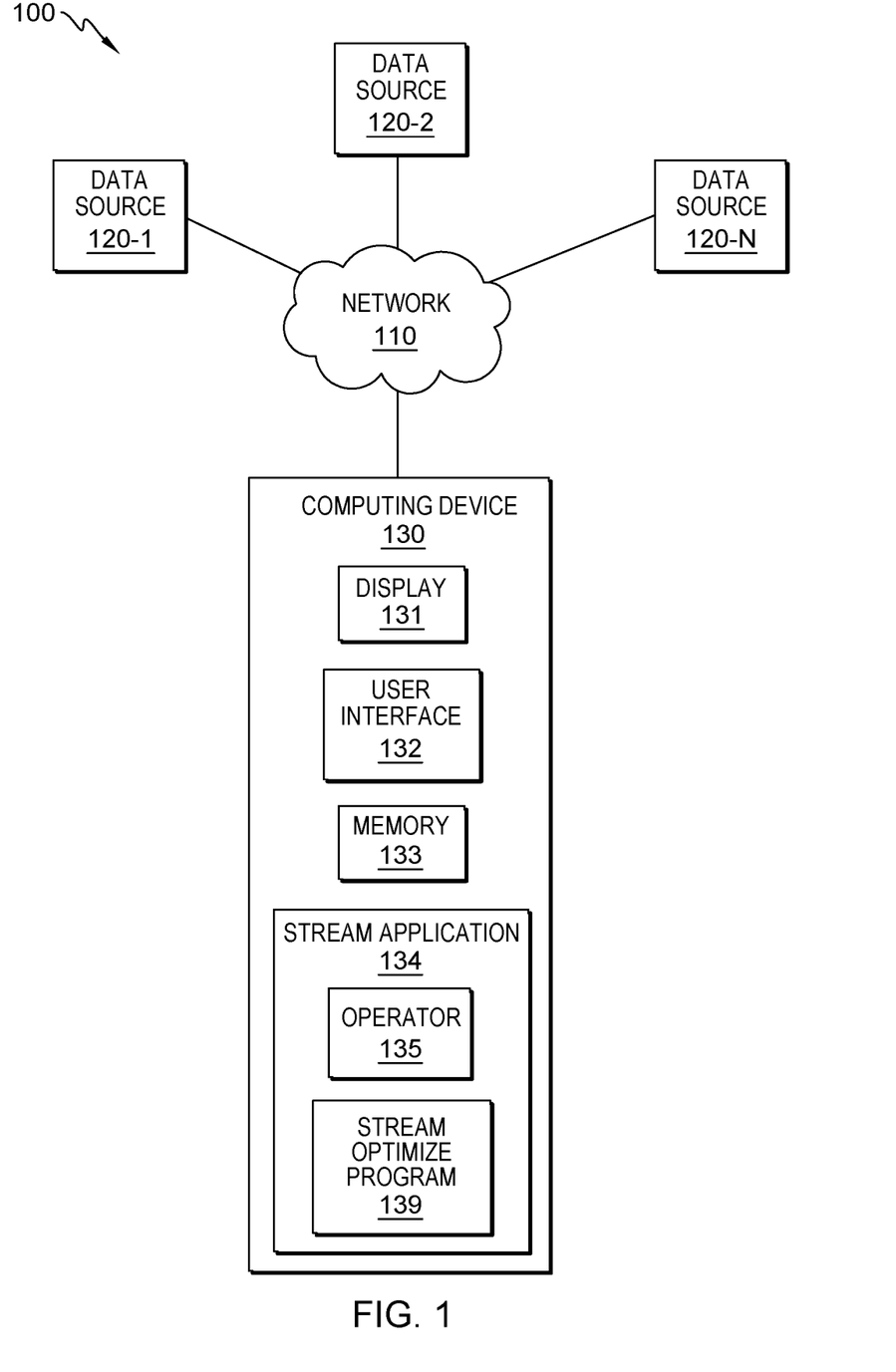
FIG. 1 depicts a functional block diagram illustrating a computing environment which includes a stream processing application, in accordance with an embodiment of the present invention.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes data source 120-1, data source 120-2, data source 120-N, and computing device 130, interconnected by network 110.

In example embodiments, computing environment 100 includes other computing devices (not shown in FIG. 1) such as smartwatches and other wearable technology, cell phones, smartphones, phablets, tablet computers, additional laptop computers, additional desktop computers, other computer servers, or any other computer system known in the art, interconnected with data source 120-1, data source 120-2, data source 120-N, and computing device 130 over network 110. For ease of readability, data source 120-N will be used (where feasible) in this paper to collectively refer to data source 120-1, data source 120-2, and data source 120-N.

In embodiments of the present invention, data source 120-N and computing device 130 are connected to network 110, which enables data source 120-N and computing device 130 to access other computing devices and/or data not directly stored on data source 120-N and computing device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between data source 120-N and computing device 130, and any other computing devices (not shown in FIG. 1) connected to network 110, in accordance with embodiments of the present invention. In an embodiment, data received by another computing device (not shown in FIG. 1) in computing environment 100 is communicated to computing device 130 via network 110.

In an embodiment, data source 120-N is one of any number of data sources accessible by computing device 130 over network 110. According to an embodiment of the present invention, data source 120-N is a big data source. Big data is comprised of large volumes of data presented in a continuous stream. Data source 120-N can include, but is not limited to, social media data (e.g., user comments and photos), transactional data (e.g., financial trading), sensor (e.g., temperature and pressure) data, Internet of Things data (e.g., video security data), and data from manufacturing machines (e.g., operating temperature and oxygen content).

According to an embodiment of the present invention, computing device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, computing device 130 can be a standalone computing device, a management server, a web server, a mobile computing device, or any other electronic device or computing system capable of receiving, transmitting, and processing data. In other embodiments, computing device 130 can represent computing systems utilizing multiple computers as a server system, such as in a cloud computing environment. In certain embodiments, computing device 130 represents a computer system utilizing clustered computers and components (e.g., database server computers, application server computers, etc.) that act as a single pool of seamless resources when accessed by elements of computing environment 100. In general, computing device 130 is representative of any electronic device or combination of electronic devices capable of executing computer readable program instructions. In an embodiment, computing environment 100 includes any number of computing device 130. Computing device 130 may include internal and external hardware components as depicted and described in further detail with respect to FIG. 4, in accordance with embodiments of the present invention. According to an embodiment of the present invention, computing device 130 includes display 131, user interface 132, memory 133, and stream application 134.

According to an embodiment, display 131 is an electronic visual device for a desktop computer, laptop computer, tablet computer, smartphone, smart-watch, and the like. Display 131 may include a touchscreen which is an input device layered on top of the display for allowing a user to control an electronic device via simple or multi-touch gestures by touching display 131 with a special stylus and/or one or more fingers. Display 131 displays open programs and applications, allowing a user of computing device 130 to interact with the open programs and applications via a keyboard, mouse, and buttons (not shown in FIG. 1). Display 131 may be a thin film transistor liquid crystal display (TFT-LCD), a flat panel LED (light emitting diode) display, a cathode ray tube (CRT), or any type of display device known in the art or developed in the future. Display 131 may be connected to computing device 130 via VGA (video graphics array), DVI (digital video interface), HDMI (High Definition Multi-Media Interface), or any other connection type known in the art or developed in the future.

In an embodiment, user interface 132 provides an interface between a user of computing device 130 and stream optimize program 139 (discussed below). User interface 132 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 132 may also be mobile application software that provides an interface between computing device 130 and stream optimize program 139. Mobile application software, or an "app," is a computer program designed to run on smartphones, tablet computers and other mobile devices. User interface 132 enables a user of computing device 130 to interact with stream optimize program 139 and any other computing devices not shown in FIG. 1.

According to an embodiment, memory 133 is storage that is written to and/or read by stream optimize program 139, and any other programs and applications on computing device 130. In one embodiment, memory 133 resides on computing device 130. In other embodiments, memory 133 resides on any other device (not shown in FIG. 1) in computing environment 100, in cloud storage, or on another computing device accessible via network 110. In yet another embodiment, memory 133 represents multiple storage devices within computing device 130. Memory 133 may be implemented using any volatile or non-volatile storage media for storing information, as known in the art. For example, memory 133 may be implemented with a tape library, optical library, one or more independent hard disk drives, multiple hard disk drives in a redundant array of independent disks (RAID), solid-state drives (SSD), or random-access memory (RAM). Similarly, memory 133 may be implemented with any suitable storage architecture known in the art, such as a relational database, an object-oriented database, or one or more tables. In an embodiment of the present invention, stream optimize program 139, and any other programs and applications (not shown in FIG. 1)

operating on computing device 130 may store, read, modify, or write data to memory 133. In an embodiment of the present invention, data stored to memory 133 includes, but is not limited to, data stored by stream optimize program 139 such as various results of processing data source 120-N.

In an embodiment, stream application 134 is one of a plurality of applications used in the stream processing of large volumes of data, such as data source 120-N. According to an embodiment, stream application 134 takes data from a data source that feeds the data, passes said data onto any number of operators (which process the data into one or more results), and then the results are passed downstream by a data sink for storage or further processing. In an embodiment, stream application 134 includes operator 135 and stream optimize program 139.

According to an embodiment, operator 135 are a plurality of operators within stream application 134 that act on data (i.e., process data in an incoming data stream and produce an output stream of results). Operator 135 are written by program developers. Operator 135 can be replicated (i.e., parallelized) to distribute workload from the incoming data stream. A set of replicated operator 135 is called a channel.

In an embodiment, stream optimize program 139 can be a program, a subprogram of a larger program, an application, a plurality of applications, or mobile application software, which functions to dynamically balance the flow of data in parallel regions of a stream data process used in the real-time analysis of big data. According to an embodiment, a parallel region is a region within a stream application where existing operators are replicated allowing for data streams to be split amongst the replicated operators for improved data processing. A program is a sequence of instructions written to perform a specific task. In an embodiment, stream optimize program 139 runs independently. In other embodiments, stream optimize program 139 depends on system software and/or other programs (not shown in FIG. 1) to execute. According to an embodiment, stream optimize program 139 is a cognitive system based on artificial intelligence utilizing machine learning and deep learning that analyzes the flow of one or more data streams in order to balance the data flow of said one or more streams. In the embodiment, stream optimize program 139 can split data streams and replicate operators so that the data can be processed in parallel. In one embodiment, stream optimize program 139 functions as a stand-alone program residing on computing device 130. In another embodiment, stream optimize program 139 works in conjunction with other programs, applications, etc., found in computing environment 100. In yet another embodiment, stream optimize program 139 resides on other computing devices (not shown in FIG. 1) in computing environment 100, which are interconnected to computing device 130 via network 110.

According to an embodiment, stream optimize program 139 receives data from one or more data sources. In the embodiment, stream optimize program 139 determines a data flow (i.e., a volume of data, a data rate, etc.). Further yet in the embodiment, stream optimize program 139 initializes one or more operators. Further yet in the embodiment, stream optimize program 139, transmits the data to the initialized operators. Further yet in the embodiment, stream optimize program 139, monitors both the data flow and the computing system processing said data flow. Further yet in the embodiment, stream optimize program 139 identifies a change to the received data. Further yet in the embodiment, based on the identified change to the received data, stream optimize program 139 adjusts the data stream and/or the operators. Further yet in the embodiment, stream optimize program 139 processes the data. Further yet in the embodiment, stream optimize program 139 transmits the results of the processed data.

Figure 2:
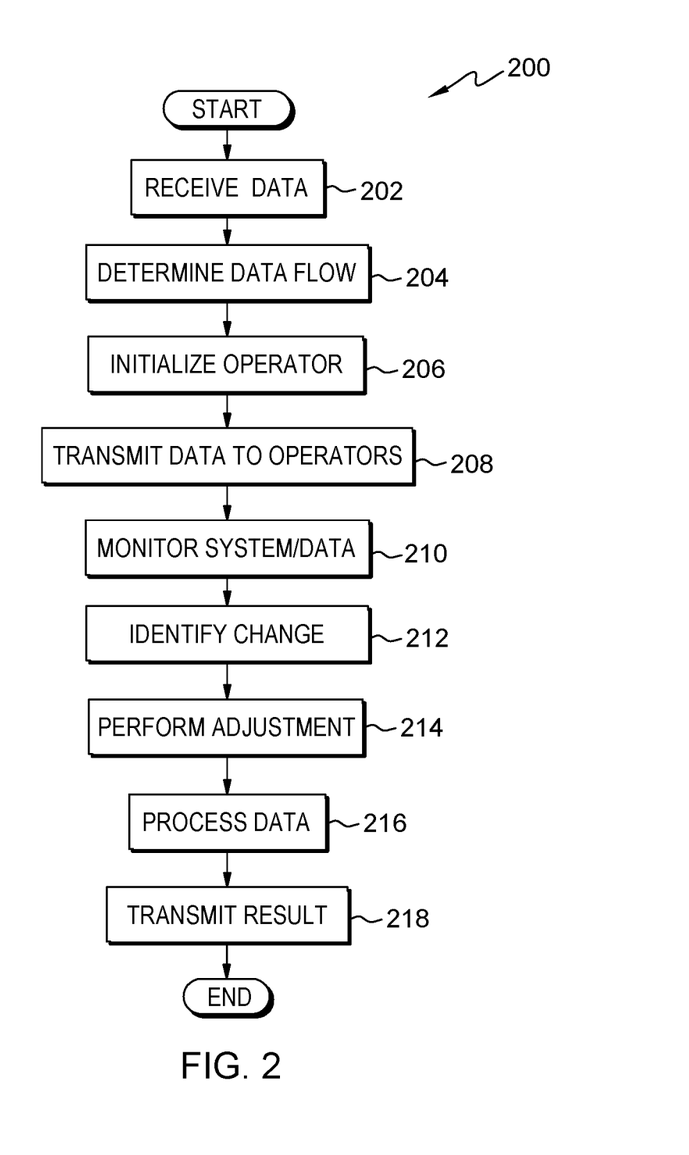
FIG. 2 is a flowchart depicting operational steps of a stream optimization program providing for the balancing of the flow of data in parallel regions of a stream data process, on a computing device within the computing environment of FIG. 1, in accordance with an embodiment of the present invention.

FIG. 2 is a flowchart of workflow 200 depicting a method for dynamically balancing the flow of data in parallel regions of a stream data process used in the real-time analysis of big data. In one embodiment, the method of workflow 200 is performed by stream optimize program 139. In an alternative embodiment, the method of workflow 200 is performed by any other program working with stream optimize program 139. In an embodiment, a user of computing device 130 invokes workflow 200 upon accessing a data stream. In an alternative embodiment, a user of computing device 130 invokes workflow 200 upon identifying one or more sources of data.

In an embodiment, stream optimize program 139 receives data (step 202). In other words, stream optimize program 139 receives data from one or more data sources. According to an embodiment, the received data is comprised of a large volume of streaming data and the data is received at a near constant rate. In an embodiment, stream optimize program 139 receives a stream of data from data source 120-N over network 110. For example, Dan is an engineer at a jet engine manufacturing company responsible for new engine development. Today, Dan is running a flight simulation on a new engine and a program on the company server is receiving tens of terabytes of data from hundreds of sensors that monitor the engine during the three hour simulation.

According to an embodiment of the present invention, stream optimize program 139 determines data flow (step 204). In other words, stream optimize program 139 determines a data flow rate of the received data. In one embodiment, the data flow rate is near constant and the determination is simply data volume for a specific time period (e.g., terabytes/hour). In another embodiment, the data flow rate is constantly changing, and the determination is an instantaneous rate at each point in time the determination is made. According to an embodiment, stream optimize program 139 determines the data flow rate of the received data from data source 120-N. For example, the program on the company server determines an approximate data flow rate of twenty terabytes of data per hour for an anticipated total of sixty terabytes of data for the entire three hour simulation.

In an embodiment, stream optimize program 139 initializes operator (step 206). In other words, responsive to determining the data flow rate, stream optimize program 139 initializes a number of operators within the stream application to properly process the data. A low volume/flow rate of data requires fewer operators than a high volume/flow rate would require. According to an embodiment, an operator is a functional piece of a stream application that acts on data to determine a specific result. A stream application can include any number of operators. In an embodiment, stream optimize program 139 initializes a number of operator 135 within stream application 134. For example, the program on the company server initializes eight operators on an application server to process the twenty terabytes per hour of simulation data associated with the jet engine.

According to an embodiment of the present invention, stream optimize program 139 transmits data to operators (step 208). In other words, stream optimize program 139 transmits the received data to the initialized operator(s) for processing. In one embodiment, data is transmitted within a computing device for processing. In another embodiment, data is transmitted over a network from one computing device to another computing device (where the operator(s) are located) for processing. According to an embodiment, stream optimize program 139 on computing device 130 transmits the received data to operator 135 within stream application 134. For example, the program on the company server transmits the engine simulation data to the application server, where the eight operators reside, for processing.

According to some embodiments, stream optimize program 139 monitors system/data (step 210). In other words, stream optimize program 139 monitors both the computing system processing the stream of data as well as the data stream for any changes that may impact data processing. In an embodiment, items monitored by stream optimize program 139 include, but are not limited to, the overall status of the computing system, available computing resources in the computing system, usage of said resources within the computing system, the initialized operator(s) within the stream application, and the flow of data into the computing system. According to an embodiment of the present invention, stream optimize program 139 monitors computing device 130, the flow of data from data source 120-N, and stream application 134 for changes. For example, the program on the company server monitors the application server and the engine simulation data for any changes.

According to an embodiment of the present invention, stream optimize program 139 identifies change (step 212). In other words, responsive to monitoring the computing system and the data, stream optimize program 139 identifies a change. In an embodiment, the identified change is to one or both of the computing system processing the data stream and the data stream itself. Stream optimize program 139 may use available system monitors installed in the computing system to monitor the health of said system. Further, stream optimize program 139 may identify when data processing slows or stops as part of the identification of a change to the system or the data. According to an embodiment, stream optimize program 139 identifies a change to one or both of computing device 130 and the flow of data from data source 120-N. For example, the program on the company server identifies that the flow rate of engine simulation data has increased from the determined twenty terabytes per hour to forty terabytes per hour.

In an embodiment, stream optimize program 139 performs adjustment (step 214). In other words, responsive to identifying a change to one or both of the computing system and the received data, stream optimize program 139 performs an adjustment to compensate for the identified change. According to an embodiment, stream optimize program 139 may perform an adjustment to the computing system, perform an adjustment to the transmission of data to the operator(s), or perform both adjustments. In an embodiment, stream optimize program 139 performs on adjustment on one or both of computing device 130 and the transmission of data from data source 120-N to operator 135 in stream application 134 on computing device 130. For example, in response to the rate of data flow doubling, the program on the company server parallelizes (replicates) the eight operators in the application server resulting in a total of sixteen operators. In the example, there are eight pairs of operators. The original eight operators, which can be represented as OP-1A through OP-8A, are replicated creating parallelized operators OP-1B through OP-8B. Operators OP-1A and OP-1B perform the same operation or function on the data, OP-2A and OP2-B perform the same operation, and for each subsequent pair of operators one individual operator performs the same operation in a like manner as the other operator in the pair.

In addition to the parallelization of operators described above, the following paragraphs will discuss other embodiments of the present invention that may be identified by stream optimize program 139 as well as an appropriate response to the embodiment by stream optimize program 139. None of the changes discussed below to the size of the parallel region of a stream application made by stream optimize program 139 are disruptive to the processing of the data.

In a first additional embodiment, stream optimize program 139 may identify that the size of the computing resources for processing the data stream has changed. For example, if the total capability of the central processing unit is reduced by the loss of one or more processing cores, the transmission of data to the operator(s) can be reduced by stream optimize program 139 so that processing of the data can continue. In another example, data may be routed by stream optimize program 139 to one or more operators in channels (a channel is a set of replicated operators) that include more computing resources (e.g., processor capability, memory, network bandwidth, etc.) than some other channels.

In a second additional embodiment, stream optimize program 139 may identify a change to the usage of computing resources available to process the data stream. For example, if memory available in the computing system, currently used in the processing of the data, is occupied by a higher priority application, stream optimize program 139 can slow or stop the transmission of data to the operator(s) until such time that the memory becomes available again for the processing of the data stream. In another example, stream optimize program 139 may transmit data to a particular channel over other channels if the particular channel has lower resource usage.

In a third additional embodiment, stream optimize program 139 may determine that for some period of time, achieving the highest data rate is required rather than achieving a constant data rate, which is the preferred condition of the flow of data through the computing system. For example, if stream optimize program 139 identifies a fluctuating power supply to the computing system, which would be an anomalous situation, stream optimize program 139 may increase the transmission of data to a highest possible rate to complete the processing of the data before a potential interruption to the supply of power. Alternatively, stream optimize program 139 may determine a situation where sending data at a constant rate is beneficial; in said situation, stream optimize program 139 is capable of adjusting the flow of data in such a manner.

In a fourth additional embodiment, stream optimize program 139 may determine that a throttling of the data flow is required for one or more channels. For example, if a portion of the computing resources are taken offline for a security update, stream optimize program 139 can dynamically throttle, or reduce, the flow of data to the remaining channels/operator(s) so that processing can continue. The flow rate can be returned to an optimal rate when the computing resources are again online.

In a fifth additional embodiment, stream optimize program 139 may identify a situation where priority queuing of the actual data is required. For example, if data is being processed for a social media study and data becomes available that is associated with an immediate healthcare problem, stream optimize program 139 is able to prioritize the processing of the healthcare data tuples over the social media data tuples so that the healthcare data is processed to completion first. In addition to prioritizing the healthcare data, stream optimize program 139 can preferentially transmit said data to channels with the highest available computing resources.

In a sixth additional embodiment, stream optimize program 139 is capable of dynamic learning as data is processed over time. For example, stream optimize program 139 can learn that the healthcare data discussed above always becomes available on Monday at 1:00 PM Eastern Standard Time. Accordingly, stream optimize program 139 will stop the processing of other data to assess the processing of the available healthcare data. After ensuring sufficient processing capability for the healthcare data, stream optimize program 139 will begin the processing of any other available data. In the event that even higher priority data becomes available, stream optimize program 139 is able to make the appropriate adjustments to process said higher priority data over the healthcare data. Therefore, stream optimize program 139 is able to use machine learning techniques to determine which of the load balancing techniques discussed above achieves the best results over time and is further able to apply that determined load balancing technique in the appropriate situation.

In a seventh additional embodiment, stream optimize program 139 is capable of responding to both failover and failback situations. Failover is switching to a redundant computing system upon the failure or abnormal termination of the processing application or computing system. Failback is the process of restoring the application or computing system to the previous operating condition. Failover and failback are part of a disaster recovery system for a computing system that requires high reliability and near-continuous availability. In the event of failover, stream optimize program 139 is able to transition the on-going processing of data to other available channels and a redundant computing system. In the event of failback, stream optimize program 139 restores the data processing on the initial computing system. Further, stream optimize program 139 can dynamically replicate operators on a critical path for data in the event of failover to eliminate single points of failure.

In an eighth additional embodiment, stream optimize program 139 is able to dynamically change the size of the parallel region (i.e., resize the parallel region) within the stream processing application by increasing and/or decreasing the quantity of operators in the parallel region. Please refer to the previous discussion of parallelizing the operators within the application server to increase the available operators from eight to sixteen as well as the discussion of FIGS. 3A and 3B below. In this embodiment, stream optimize program 139 is also able to reduce (i.e., decrease) the number of operators in the parallel region of the stream application in response to a reduction to the flow of data to be processed.

In a ninth additional embodiment, stream optimize program 139 is able to detect a change to the size (i.e., width) of a parallel region and dynamically reduce the data rate in response. For example, if one or more nodes containing operators suddenly become unavailable, stream optimize program 139 is able to reduce the flow of data so that the remaining operators can process the data without interruption.

According to an embodiment of the present invention, stream optimize program 139 processes data (step 216). In other words, responsive to performing an adjustment to the channels and/or the data flow, stream optimize program 139 allows for the downstream processing of the data by the operator(s). In an embodiment, based on the adjustment performed by stream optimize program 139, the processing occurs in the most efficient manner available for the computing system. According to an embodiment, stream optimize program 139 allows for the processing of the data by operator 135 on computing device 130. For example, the program on the company server allows the sixteen operators on the application server to process the engine simulation data.

In an embodiment, stream optimize program 139 transmits result (step 218). In other words, stream optimize program 139, upon completion of the data processing, transmits the results of said processing, to a destination. According to an embodiment, the destination may be a user, one or more other applications for additional processing, or a memory for storage. In an embodiment, stream optimize program 139 stores the results of the processed data to memory 133 on computing device 130. For example, the program on the company server transmits the processed engine simulation data to a laptop computer utilized by Dan so that Dan can study the data by comparing the new data to historical simulation data.

The above described process is iterative in nature. As additional data is received, the process repeats in a dynamic manner to process the data in the most efficient manner. This is achieved by stream optimize program 139 performing the described load balancing adjustments.

Figure 3A:
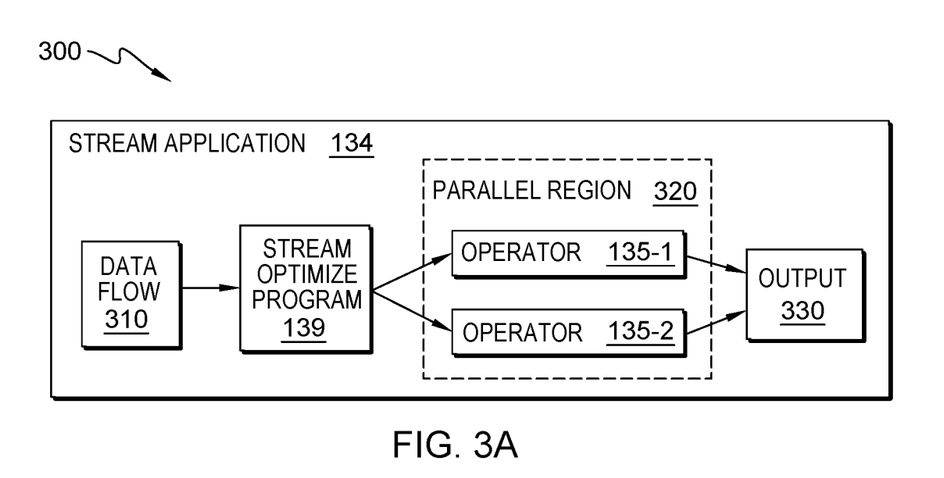
FIG. 3A depicts a first example of a parallel region within a stream processing application, in accordance with an embodiment of the present invention.

FIG. 3A depicts example 300 of a first parallel region within stream application 134 of FIG. 1. FIG. 3A includes data flow 310, stream optimize program 139, parallel region 320, and output 330. Parallel region 320 includes operator 135-1 and operator 135-2 and thus is a width of two. Due to the size and rate of data flow 310, only operator 135-1 and operator 135-2 are required to efficiently process data flow 310 of example 300. The results of the data processing are output 330.

Figure 3B:
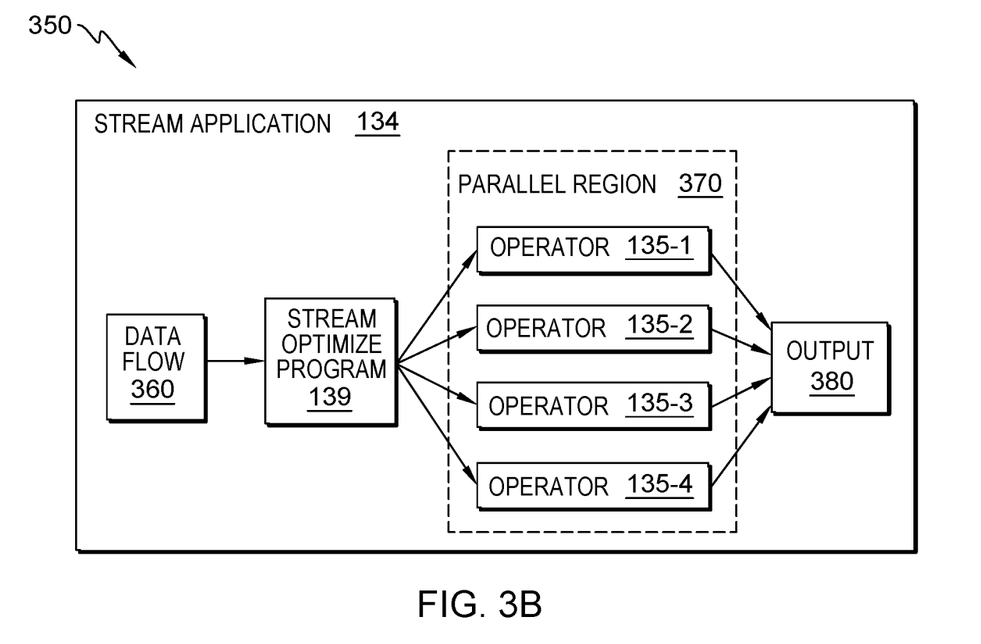
FIG. 3B depicts a second example of a parallel region within a stream processing application, in accordance with an embodiment of the present invention.

FIG. 3B depicts example 350 of a second parallel region within stream application 134 of FIG. 1. FIG. 3B includes data flow 360, stream optimize program 139, parallel region 370, and output 380. Parallel region 370 includes operator 135-1, operator 135-2, operator 135-3, and operator 135-4 and thus is a width of four. In example 350, data flow 360 is double that of data flow 310 in FIG. 3A. Therefore, stream optimize program 139 dynamically parallelizes (or replicates) the original parallel region 320 (in FIG. 3A) creating parallel region 370 thus doubling the operators from two (i.e., operator 135-1 and operator 135-2) to four (i.e., operator 135-1, operator 135-2, operator 135-3, and operator 135-4). This allows for the efficient processing of data flow 360. The results of the data processing are output 380.

Figure 4:
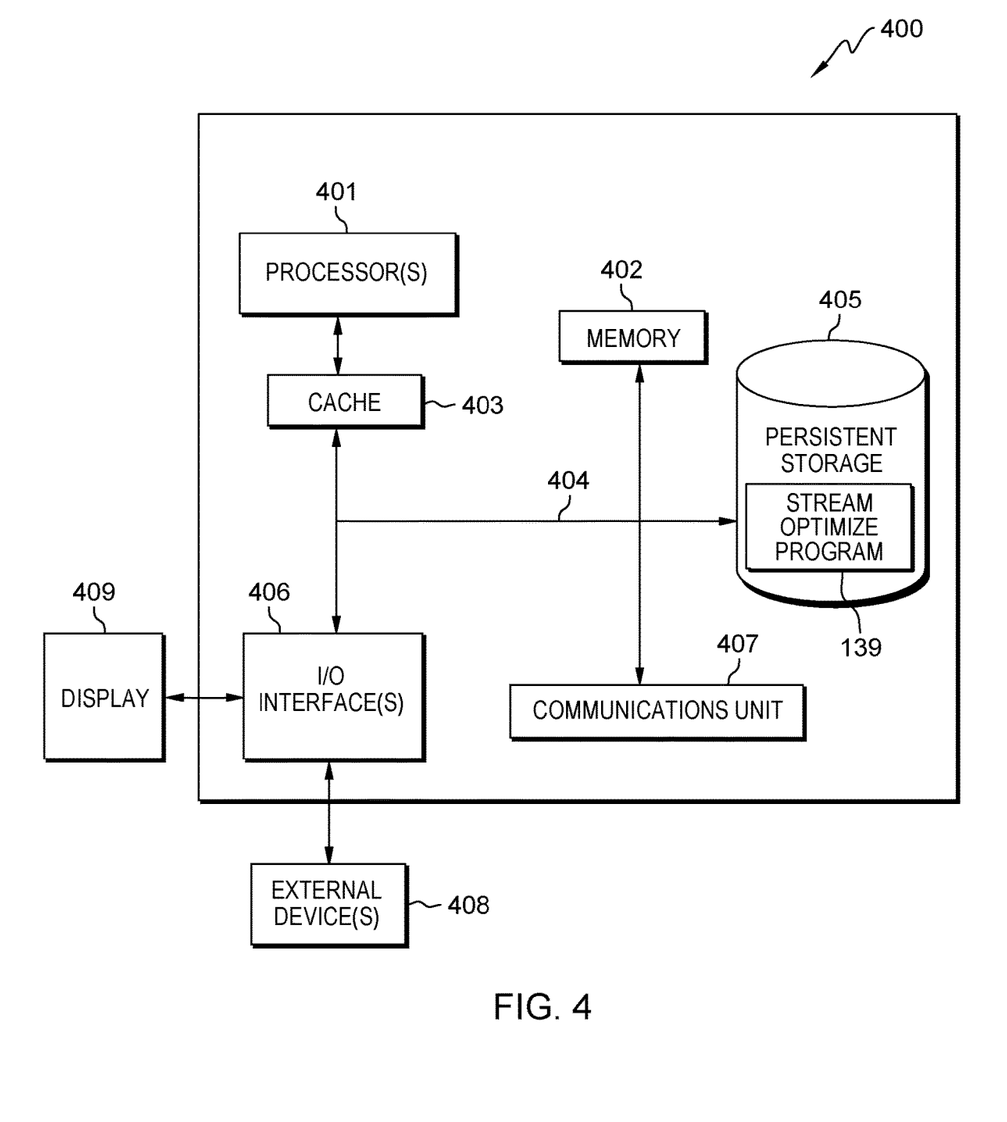
FIG. 4 depicts a block diagram of components of a computing device executing a stream optimization program within the computing environment of FIG. 1, in accordance with an embodiment of the present invention.

FIG. 4 depicts computer system 400, which is an example of a system that includes stream optimize program 139. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   responsive to determining a rate of a flow of data, initializing, by one or more computer processors, one or more operators in a parallel region included in a distributed data processing system for stream processing of the flow of data based on the determined rate;
   responsive to identifying a change in the flow of data or a change in the distributed data processing system, dynamically adjusting, by one or more computer processors, the flow of data by modifying a size of the parallel region included in the distributed data processing system and adjusting the rate of the flow of the data to the parallel region;
   processing, by one or more computer processors, the flow of data via the dynamically adjusted flow of data in the distributed data processing system;
   in response to detecting a change to a width of the parallel region, dynamically reducing the flow of data; and
   in response to identifying a fluctuating power supply, increasing the flow of data to a highest possible rate to complete processing of the data before a potential interruption to the power supply.

2. The method of claim 1, wherein the step of dynamically adjusting, by one or more computer processors, the flow of data in the distributed data processing system, comprises:
   dynamically adjusting, by one or more computer processors, the flow of data between the one or more operators in the parallel region to balance a load of the flow of data.

3. The method of claim 1, wherein the step of dynamically adjusting, by one or more computer processors, the flow of data in the distributed data processing system, comprises:
   achieving, by one or more computer processors, a highest data rate to the parallel region.

4. The method of claim 1, wherein the step of dynamically adjusting, by one or more computer processors, the flow of data in the distributed data processing system, comprises:
   responsive to a reduction in one or more computing resources included in the distributed data processing system, dynamically throttling, by one or more computer processors, the flow of data in the distributed data processing system.

5. The method of claim 1, wherein the step of dynamically adjusting, by one or more computer processors, the flow of data in the distributed data processing system, comprises:
   responsive to receiving a higher priority flow of data, queuing, by one or more computer processors, one or more data tuples which comprise the higher priority flow of data over one or more other flows of data.

6. The method of claim 1, further comprising:
   dynamically learning, by one or more computer processors, a plurality of load balancing methodologies via machine learning techniques based on a plurality of distributed data processing scenarios; and
   applying, by one or more computer processors, one of the plurality of learned load balancing methodologies for a specific distributed data processing scenarios that is best able to process the flow of data in the specific distributed data processing scenario.

7. The method of claim 1, wherein the step of dynamically adjusting, by one or more computer processors, the flow of data in the distributed data processing system, comprises:
   responsive to a failover, transmitting, by one or more computer processors, the flow of data to a redundant distributed data processing system; and
   responsive to a failback, restoring, by one or more computer processors, the flow a data to the distributed data processing system.

8. The method of claim 1, wherein the step of dynamically adjusting, by one or more computer processors, the flow of data in the distributed data processing system, comprises:
   responsive to a change in a quantity of operators in the parallel region, dynamically adjusting, by one or more computer processors, the flow of data to the parallel region, wherein:
      responsive to an increase in the quantity of operators, increase the flow of data; and
      responsive to a decrease in the quantity of operators, decrease the flow of data.

9. The computer-implemented method of claim 7, further comprising:
eliminating single points of failure by dynamically replicating operators on a critical path for data in response to the failover.

10. A computer program product, the computer program product comprising:
one or more computer readable storage media; and
program instructions stored on the one or more computer readable storage media, the program instructions comprising:
responsive to determining a flow of data, program instructions to initialize one or more operators in a parallel region included in a distributed data processing system for stream processing of the flow of data based on the determined rate;
responsive to identifying a change in the flow of data or a change in the distributed data processing system, program instructions to dynamically adjust the flow of data by modifying a size of the parallel region included in the distributed data processing system and adjusting the rate of the flow of the data to the parallel region; and
program instructions to process the flow of data via the dynamically adjusted flow of data in the distributed data processing system;
program instructions to, in response to detecting a change to a width of the parallel region, dynamically reduce the flow of data; and
program instructions to, in response to identifying a fluctuating power supply, increase the flow of data to a highest possible rate to complete processing of the data before a potential interruption to the power supply.

11. The computer program product of claim 10, wherein the program instructions to dynamically adjust the flow of data in the distributed data processing system, comprise:
program instructions to dynamically adjust the flow of data between the one or more operators in the parallel region to balance a load of the flow of data.

12. The computer program product of claim 10, wherein the program instructions to dynamically adjust the flow of data in the distributed data processing system, comprise:
program instructions to achieve a highest data rate to the parallel region.

13. The computer program product of claim 10, wherein the program instructions to dynamically adjust the flow of data in the distributed data processing system, comprise:
responsive to a reduction in one or more computing resources included in the distributed data processing system, program instructions to dynamically throttle the flow of data in the distributed data processing system.

14. The computer program product of claim 10, wherein the program instructions to dynamically adjust the flow of data in the distributed data processing system, comprise:
responsive to receiving a higher priority flow of data, program instructions to queue one or more data tuples which comprise the higher priority flow of data over one or more other flows of data.

15. The computer program product of claim 10, further comprising program instructions stored on the one or more computer readable storage media, to:
dynamically learn a plurality of load balancing methodologies via machine learning techniques based on a plurality of distributed data processing scenarios; and
apply one of the plurality of learned load balancing methodologies for a specific distributed data processing scenarios that is best able to process the flow of data in the specific distributed data processing scenario.

16. The computer program product of claim 10, wherein the program instructions to dynamically adjust the flow of data in the distributed data processing system, comprise:
responsive to a failover, program instructions to transmit the flow of data to a redundant distributed data processing system; and
responsive to a failback, program instructions to restore the flow a data to the distributed data processing system.

17. The computer program product of claim 10, wherein the program instructions to dynamically adjust the flow of data in the distributed data processing system, comprise:
responsive to a change in a quantity of operators in the parallel region, program instructions to dynamically adjust the flow of data to the parallel region, wherein:
responsive to an increase in the quantity of operators, the flow of data is increased; and
responsive to a decrease in the quantity of operators, the flow of data is decreased.

18. A computer system, the computer system comprising:
one or more computer processors;
one or more computer readable storage media; and
program instructions stored on the one or more computer readable storage media for execution by at least one of the one or more computer processors, the program instructions comprising:
responsive to determining a flow of data, program instructions to initialize one or more operators in a parallel region included in a distributed data processing system for stream processing of the flow of data based on the determined rate;
responsive to identifying a change in the flow of data or a change in the distributed data processing system, program instructions to dynamically adjust the flow of data by modifying a size of the parallel region included in the distributed data processing system and adjusting the rate of the flow of the data to the parallel region; and
program instructions to process the flow of data via the dynamically adjusted flow of data in the distributed data processing system;
program instructions to, in response to detecting a change to a width of the parallel region, dynamically reduce the flow of data; and
program instructions to, in response to identifying a fluctuating power supply, increase the flow of data to a highest possible rate to complete processing of the data before a potential interruption to the power supply.

* * * * *